US010624109B2

(12) United States Patent
Huang

(10) Patent No.: US 10,624,109 B2
(45) Date of Patent: *Apr. 14, 2020

(54) ELIMINATING CROSSED TIMESLOTS INTERFERENCE

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,535

(22) Filed: Mar. 19, 2018

(65) Prior Publication Data

US 2018/0359769 A1 Dec. 13, 2018

Related U.S. Application Data

(63) Continuation of application No. 14/127,192, filed as application No. PCT/CN2013/070374 on Jan. 11, 2013, now Pat. No. 9,949,283.

(51) Int. Cl.
*H04W 72/12* (2009.01)
*H04W 16/02* (2009.01)
*H04W 16/12* (2009.01)
*H04L 5/14* (2006.01)
*H04L 12/743* (2013.01)
*H04W 8/00* (2009.01)
*H04W 72/04* (2009.01)

(52) U.S. Cl.
CPC ......... *H04W 72/1226* (2013.01); *H04L 5/14* (2013.01); *H04L 45/7453* (2013.01); *H04W 8/005* (2013.01); *H04W 16/02* (2013.01); *H04W 16/12* (2013.01); *H04W 72/0446* (2013.01)

(58) Field of Classification Search
CPC ......... H04W 72/0446; H04W 72/1226; H04W 16/02
See application file for complete search history.

(56) References Cited

U.S. PATENT DOCUMENTS 7,978,624 B2   7/2011   Wang et al.
8,442,525 B2   5/2013   Luo et al.
(Continued)

FOREIGN PATENT DOCUMENTS

CN   101388697 A   3/2009
CN   101981999 A   2/2011
(Continued)

OTHER PUBLICATIONS

"3rd Generation Partnership Project, Technical Specification Group Radio Access Network," Evolved Universal Terrestrial Radio Access (E-UTRA) and Evolved Universal Terrestrial Radio Access Network (E-UTRAN), Overall description, Stage 2, vol. 11.7.0, pp. 1-209, 3GPP TS 36.300 (Sep. 2013).
(Continued)

*Primary Examiner* — Walli Z Butt
*Assistant Examiner* — Ryan C Kavleski

(57) ABSTRACT

In an example embodiment, one or more scheduler of base stations may be configured to schedule resource blocks on a frequency band of two adjacent cells to eliminate crossed timeslots interference by selecting different starting points on the frequency band.

20 Claims, 6 Drawing Sheets

(56) References Cited

U.S. PATENT DOCUMENTS

| | | | |
|---|---|---|---|
| 2010/0157924 A1 | 6/2010 | Prasad et al. | |
| 2010/0210255 A1* | 8/2010 | Amirijoo | H04W 74/002 455/419 |
| 2010/0260036 A1 | 10/2010 | Molnar et al. | |
| 2011/0021229 A1 | 1/2011 | Skoric et al. | |
| 2011/0039568 A1 | 2/2011 | Zhang et al. | |
| 2011/0075626 A1 | 3/2011 | Lee et al. | |
| 2012/0120893 A1* | 5/2012 | Baligh | H04W 24/02 370/329 |
| 2012/0140744 A1* | 6/2012 | Fang | H04L 5/0044 370/336 |
| 2013/0155917 A1 | 6/2013 | Hu et al. | |
| 2013/0250864 A1* | 9/2013 | Zhang | H04W 72/042 370/329 |
| 2014/0086224 A1 | 3/2014 | Kwon et al. | |
| 2014/0119349 A1* | 5/2014 | Takano | H04W 16/32 370/336 |

FOREIGN PATENT DOCUMENTS

| | | |
|---|---|---|
| CN | 102726085 A | 10/2012 |
| WO | 2009121010 A2 | 10/2009 |
| WO | 2012028025 A1 | 3/2012 |

OTHER PUBLICATIONS

"3rd Generation Partnership Project, Technical Specification Group Radio Access Network," Evolved Universal Terrestrial Radio Access (E-UTRA), Medium Access Control (MAC) protocol specification, vol. 11.3.0, pp. 1-57, 3GPP TS 36.321(Jun. 2013).

"3rd Generation Partnership Project, Technical Specification Group Radio Access Network," Evolved Universal Terrestrial Radio Access (E-UTRA), Physical channels and modulation, vol. 11.4.0, pp. 1-120, 3GPP TS 36.211 (Sep. 2013).

"3rd Generation Partnership Project, Technical Specification Group Radio Access Network," Evolved Universal Terrestrial Radio Access (E-UTRA), Physical layer procedures, vol. 11.4.0, pp. 1-182, 3GPP TS 36.213,(Sep. 2013).

Chang, P. et al., "Interference Analysis and Performance Evaluation for LTE TDD System," 2nd International Conference on Advanced Computer Control, vol. 5, pp. 410-414 (Mar. 27-29, 2010).

International Search Report and Written Opinion for International Patent Application No. PCT/CN2013/070374 dated Oct. 17, 2013, pp. 7.

\* cited by examiner

ELIMINATING CROSSED TIMESLOTS INTERFERENCE

CROSS-REFERENCE TO RELATED APPLICATION

The present application is a continuation application under 35 U.S.C. § 120 of U.S. application Ser. No. 14/127,192, filed on Dec. 18, 2013, now U.S. Pat. No. 9,949,283, which is the U.S. National Stage filing under 35 U.S.C. § 371 of International Application No. PCT/CN2013/070374, filed on Jan. 11, 2013. U.S. patent application Ser. No. 14/127,192 and International Application No. PCT/CN2013/070374 are hereby incorporated by reference in their entireties.

TECHNICAL FIELD

The embodiments described herein pertain generally to implementing a scheduling mechanism to eliminate crossed timeslots interference under time-division duplexing (TDD) mode.

BACKGROUND

For TDD mode, isolation of upstream and downstream channels is realized by time division. Crossed timeslots may cause strong interference when a same sub-frame is allocated to two different terminal devices that are both using a same frequency band.

SUMMARY

In one example embodiment, a method may include identifying a first wireless communication device that is within a predetermined range of an edge of a first cell and an edge of a second cell that is adjacent to the first cell, selecting a first starting point for allocation of resource blocks in the first cell for the first wireless communication device that is different from a second starting point utilized by the second cell, and scheduling resource blocks for the first wireless communication device by starting at the first starting point.

In another example embodiment, a computer-readable medium storing instructions that, when executed, may cause one or more processors to perform operations comprising selecting a first starting point for allocation of resource blocks in a first cell for a first wireless communication device that is different than a second starting point utilized by a second cell that is adjacent to the first cell, and scheduling resource blocks for the first wireless communication device by starting at the first starting point.

In yet another example embodiment, a computer-readable medium storing instructions that, when executed, may cause one or more processors to perform operations comprising identifying a first wireless communication device and a second wireless communication device that are near an edge of a first cell and an edge of a second cell adjacent to the first cell, selecting a first starting point for allocation of resource blocks in the first cell for the first wireless communication device and selecting a second starting point for allocation of resource blocks in the second cell for the second wireless communication device such that the first starting point utilized by the first cell and the second starting point utilized by the second cell are different, scheduling resource blocks for the first wireless communication device by starting at the first starting point, and scheduling resource blocks for the second wireless communication device by starting at the second starting point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
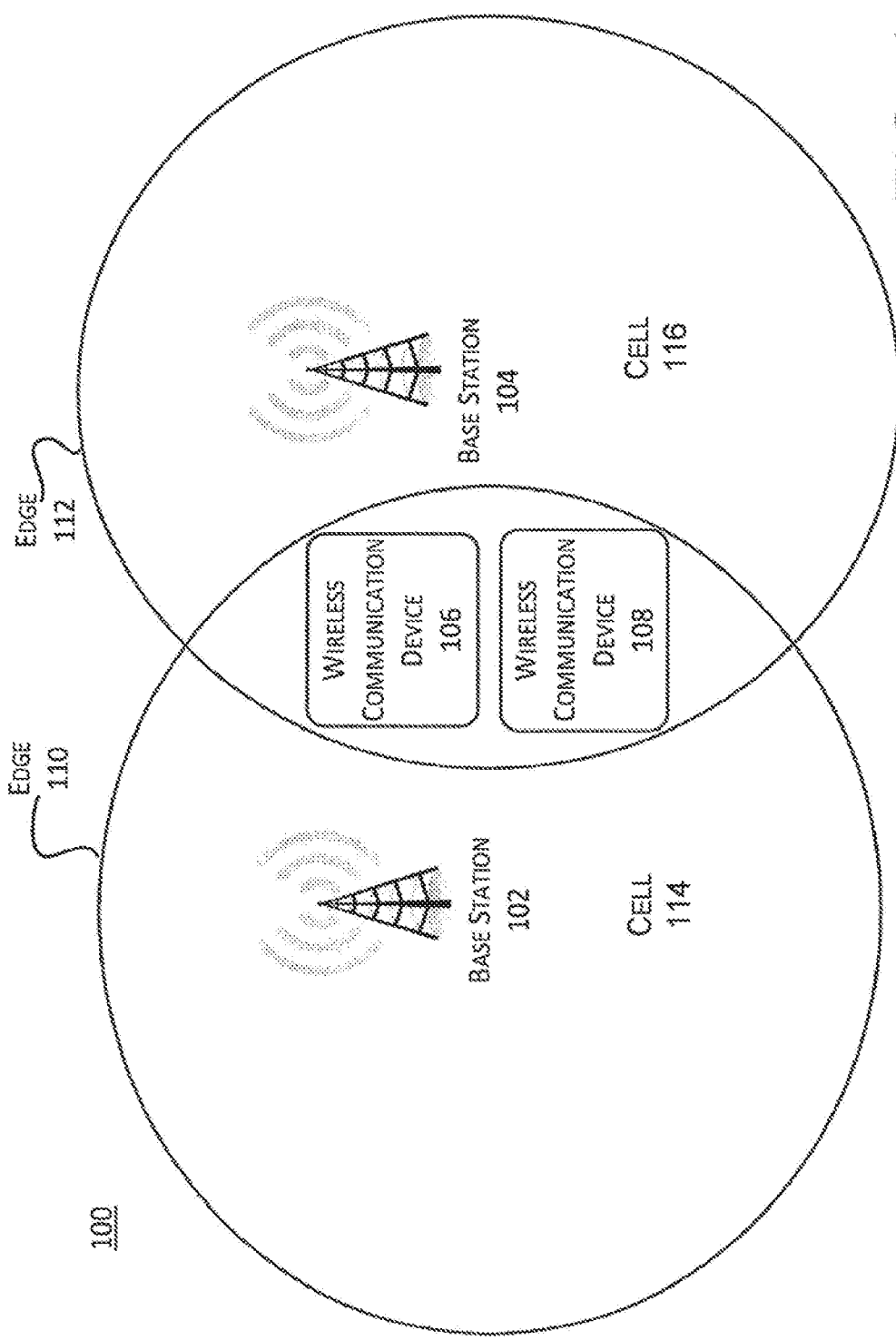
FIG. 1 shows an example wireless communication system in which one or more embodiments of eliminating crossed timeslots interference may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless communication system 100 in which one or more embodiments of eliminating crossed timeslots interference may be implemented, arranged in accordance with at least some embodiments described herein. As depicted, wireless communication system 100 includes, at least, a cell 114 bounded by edge 110, a base station 102 bounded by edge 110 within cell 114, a cell 116 bounded by edge 112, a base station 104 bounded by edge 112 within cell 116, a wireless communication device 106, and a wireless communication device 108. Base station 102 may be installed at a fixed location within the boundaries of cell 114 and, similarly, base station 104 may be installed at a fixed location within the boundaries of cell 116. Further, base station 102 may transmit wireless signals for wireless communication device 106 when it is located within the boundaries marked by edge 110, and, similarly, base station 104 may transmit wireless signals for wireless communication device 108 when it is located within the boundaries marked by edge 112.

For example, cell 114 and cell 116 may each refer to a range of radio coverage in a respective cellular network. Cell 114 and cell 116 may each be configured, by a common entity or by separate entities, to provide wireless communication for wireless communication devices therein, and may further be equipped with base station 102 and base station 104 respectively. Wireless communications supported by base station 102 and base station 104 may include any mobile communication technology, e.g., Global System for Mobile Communications (GSM), Code Division Multiple Access (CDMA), etc., depending upon the technologies supported by particular wireless service providers. For example, base station 102 may follow protocols of GSM when base station 104 may follow standards of CDMA. Such example protocols are not intended to be limiting, and therefore should not be interpreted to be so. Each cell may be assigned with a unique identification in the cellular network.

Base station 102 and base station 104 may each be configured to support electronic communication between one or more wireless communication devices located within a corresponding cell, e.g., wireless communication device 106 and wireless communication device 108, and one or more other wireless communication device that may be supported by another base station disposed in another cell. Such communication may be in accordance with different wireless communication standards including Time Division Duplexing Long Term Evolution (TDD-LTE), Frequency Division Duplexing FDD-LTE, IEEE 802.15.4, Global System for Mobile Communications (GSM), Code Division Multiple Access (CDMA) and etc., which may further determine the work mode of the respective wireless communication devices. The work modes may include time division duplexing mode and frequency division duplexing mode. Such examples are not intended to be limiting, and therefore should not be interpreted to be so.

Edge 110 and edge 112 may each define the outer boundary of a working range of cell 114 and cell 116, respectively. Wireless communication devices within the working range of base stations 102 and 104 may reliably communicate with the respective base station. However, the working range may not be fixed, depending on a number of factors including, but not limited to, surrounding terrain, the frequency of signals in use, and the required data rate of the respective wireless communication devices. Further, working ranges of two adjacent cells may be overlapping. Each of the wireless communication devices within the working range of corresponding cells may be assigned with identifiers that indicate, at least, the cell to which it belongs.

Wireless communication device 106 and wireless communication device 108 may refer to a mobile (or portable) electronic device such as a mobile phone, smartphone, personal digital assistant (PDA) a personal media player device, an application specific device, or a hybrid device that includes any of the above functions. Alternatively, at least one of wireless communication device 106 and wireless communication device 108 may be implemented as a personal computer including tablet, laptop computer, non-laptop computer configure configurations, etc. As depicted in FIG. 1, wireless communication device 106 and wireless communication device 108 may be located in an overlapping working range of cell 114 and cell 116 and may be configured to transmit signals to base station 102 and base station 104 respectively.

In an example embodiment, wireless communication device 106 and wireless communication device 108 may work under time-division duplexing (TDD) mode. Non-limiting examples of systems using time-division duplexing mode include UMTS 3G, TD-LTE, TD-SCDMA, IEEE 802.16 WiMAX. Under time-division duplexing mode, a time domain may be divided into several recurrent timeslots having a fixed length. Further, a same timeslot may be allocated for downstream traffic and upstream traffic to different wireless communication devices, which may further cause interference among wireless communication devices. For example, therefore, when wireless communication device 106 and wireless communication device 108 are both within the overlapping area of the working ranges of cell 114 and cell 116, base station 102 may allocate a timeslot to the downstream traffic of wireless communication device 106 while base station 104 may allocate the same timeslot to the upstream traffic of wireless communication device 108. If both the downstream link of wireless communication device 106 and the upstream link of wireless communication device 108 are using a same resource block (i.e., a section of bandwidth resource) it may cause interference.

Thus, FIG. 1 shows an example wireless communication system 100 in which one or more embodiments of scheduling for eliminating crossed timeslots may be implemented.

Figure 2:
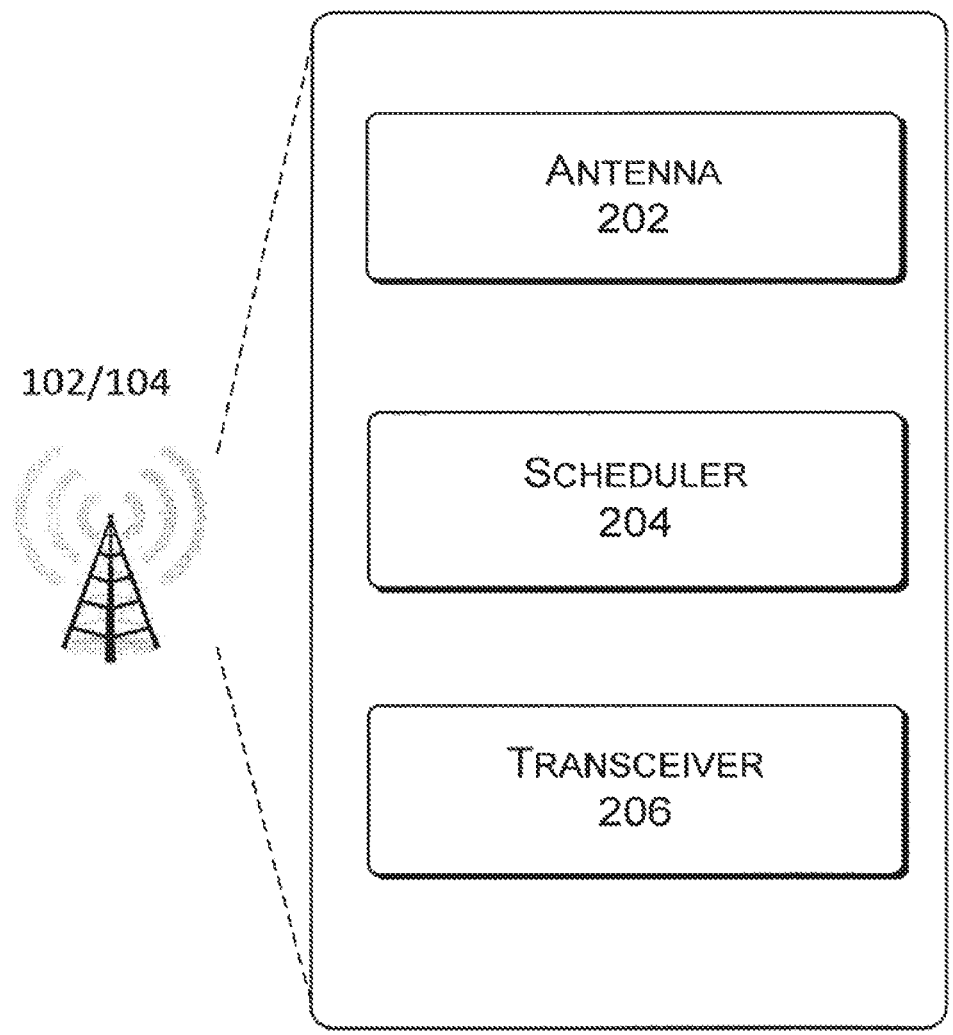
FIG. 2 shows an example base station by which one or more embodiments of eliminating crossed timeslots may be implemented, arranged in accordance with at least some embodiments described herein.

FIG. 2 shows an example base station by which one or more embodiments of eliminating crossed timeslots may be implemented, arranged in accordance with at least some embodiments described herein. As depicted, the base station may refer to either base station 102 or base station 104, and therefore, unless a distinction is needed for the purpose of the description, reference may be made to "base station 102/104." As further depicted, base station 102/104 may include an antenna 202, a scheduler 204, and a transceiver 206.

Antenna 202 may be configured to convert electric power into electromagnetic waves, and vice versa, and then to transmit signals for wireless communication. When transmitting radio signals, antenna 202 may radiate energy from an oscillating radio frequency electric current as electromagnetic waves. When receiving radio signals, antenna 202 may intercept some of the power of electromagnetic waves to produce a relative lower voltage at its terminals, which may be further amplified.

Scheduler 204 may be configured to adopt a timeslot structure from those defined by wireless communication standards implemented by base station 102/104. For example, 3rd Generation Partnership Program (3GPP) has defined seven timeslot structures for TD-LTE. Each timeslot structure defines the upstream portions and the downstream portions within a given period of time. For example, timeslot structure #1 may define the first 70% of a given time period shall be used for upstream and the remaining 30% shall be used for downstream. Scheduler 204 may select one of the defined timeslot structures and further allocate timeslots of a time domain. The base stations of two or more adjacent cells (e.g., base station 102/104) may adopt the same timeslot structure; however, in this case, the frequency bandwidth resource for the two cells may not be fully utilized. The base stations may also choose timeslot structures based on the respective upstream/downstream traffic ratio, which may, however, cause crossed timeslots interference. Further, scheduler 204 may also be configured to allocate resource blocks of a frequency band to each base station, or further, to each individual wireless communication device.

Transceiver 206 may be configured to, in transmission, transform digital or analog signals into a radio frequency electric current. In reception, transceiver 206 may be configured to transform the low voltage on the terminals of antenna 202 into digital or analog signals.

Thus, FIG. 2 shows an example base station 102/104 by which one or more embodiments of scheduling for eliminating crossed timeslots may be implemented.

Figure 3:
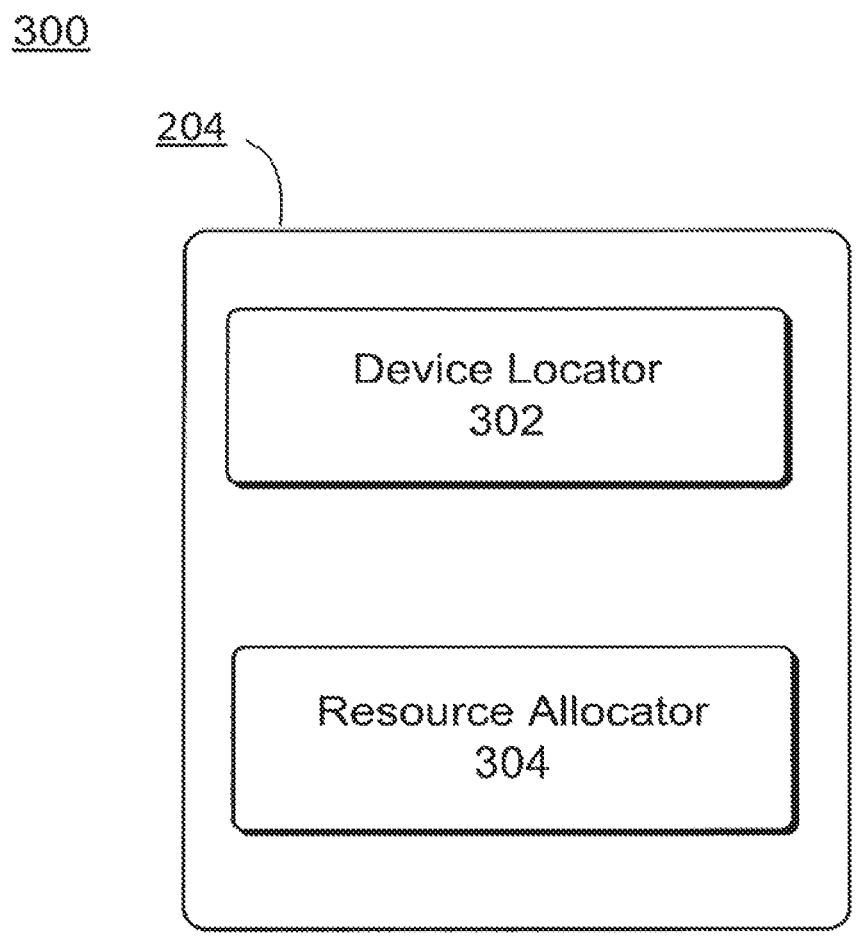
FIG. 3 shows an example scheduler by which at least portions of one or more embodiments of eliminating crossed timeslots may be implemented, arranged in accordance with at least some embodiments described herein.

FIG. 3 shows an example configuration 300 of scheduler 204 by which at least portions of one or more embodiments of eliminating crossed timeslots may be implemented, arranged in accordance with at least some embodiments described herein. As depicted, scheduler 204 may include a device locator 302 and a resource allocator 304.

Device locator may be configured to retrieve the identification information of wireless communication device 106/108 and cell 114/116 and may further determine whether the respective wireless communication device is within the working range of a respective one of cell 114 or cell 116. The respective one or more identifiers of wireless communication device 106/108 and cell 114/116 may be transmitted to resource allocator 304.

Resource allocator 304 may be configured to eliminate interference by dispersing mapping of time frequency. That is, resource allocator 304 may allocate blocks on a frequency band or timeslots on a time domain in accordance with the retrieved identification of the respective wireless communication devices retrieved by device locator 302.

In accordance with the LTE standard, individual wireless communication devices may be scheduled to occupy a section of sub-carrier wave of a frequency band. When wireless communication device 106 and wireless communication device 108 share a same time domain (i.e., the crossed timeslots of the adjacent base station), resource allocator 304 may realize dispersed mapping of frequency band by LTE scheduling algorithm. In one example embodiment, resource allocator 304 may allocate the resource blocks on a user-based scheduling algorithm by which portions of the resource blocks may be allocated to each individual wireless communication device in view of fairness. Each individual may then be allocated with one or more resource blocks proportionate to its traffic needs. Alternatively, each individual may gain equal portions of the resource blocks. In yet another example embodiment, resource allocator 304 may allocate the resource blocks based on a channel-based scheduling algorithm (e.g., maximum carrier-to-interference scheduling) to pursue the maximum throughput ratio of wireless communication system 100. Further, resource allocator 304 may adopt other algorithms to prevent the crossed timeslots interference instead of eliminating or mitigating the interference.

Thus, FIG. 3 shows an example configuration 300 of an example scheduler 204 in which one or more embodiments of scheduling for eliminating crossed timeslots may be implemented.

Figure 4:
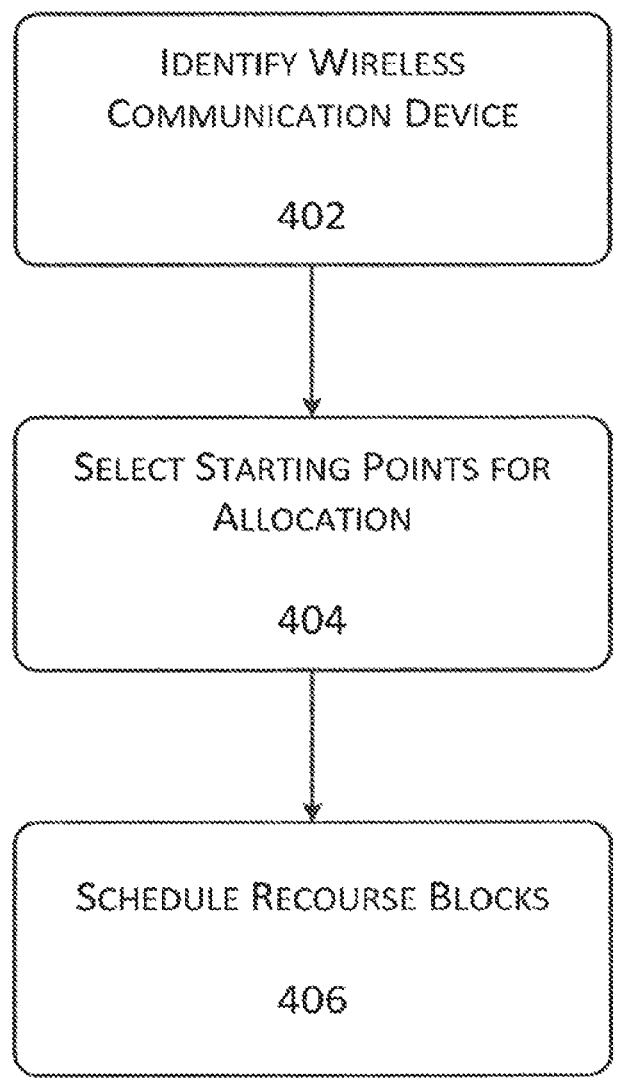
FIG. 4 shows an example configuration of a processing flow of operations for which embodiments of eliminating crossed timeslots may be implemented, arranged in accordance with at least some embodiments described herein.

FIG. 4 shows an example configuration of a processing flow 400 of operations for which embodiments of eliminating crossed timeslots may be implemented, arranged in accordance with at least some embodiments described herein. As depicted, processing flow 400 may include sub-processes executed by various components that are part of wireless communication system 100. However, processing flow 400 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operation, functions, or actions as illustrated by one or more of blocks 402, 404, and/or 406. Processing may begin at block 402.

Block 402 (Identify Wireless Communication Device) may refer to device locator 302 identifying wireless communication device 106 and wireless communication device 108, and determining that wireless communication device 106 and wireless communication device 108 are within a predetermined range of edge 110 of cell 114 and edge 112 of cell 116. The one or more identifiers of wireless communication device 106/108 and cell 114/116 may be transmitted to resource allocator 304. Processing may continue from block 402 to block 404.

Block 404 (Select Starting Points for Allocation) may refer to resource allocator 304 selecting a first starting point for allocation of resource blocks for communication between wireless communication device 106 in cell 114 and a different second starting point for allocation for communication between wireless communication device 108 in cell 116. The resource blocks may be created by evenly dividing frequency band of cell 114 and cell 116.

In one example embodiment, resource allocator 304 may utilize a hashing function to select the first starting point. The hashing function may map an identification of cell 114 with a certain starting point of the resource block. In another example embodiment, the hashing function may map an identification of wireless communication device 106/108 with a starting point of the resource blocks. More particularly, identification of cell 114/116 or wireless communication device 106/108 may be utilized as an input of the hashing function, and the output of hashing function may be a fixed value. For a given hash value, there may be one corresponding input value of the hashing function. Thus, two wireless communication devices or two cells may not be allocated to a same resource block. However, in yet another example embodiment, resource allocator 304 may simply adopt an algebraic formulation to select the first starting point. For example, resource allocator may select the second starting point with ten resource blocks away from the first starting point. Processing may continue from block 404 to block 406.

Block 406 (Schedule Resource Blocks) may refer to resource allocator 304 scheduling resource blocks for wireless communication device 106 by starting at the first starting point. Resource allocator 304 may further adopt scheduling algorithms in accordance with existing wireless communication standards.

Thus, FIG. 4 shows an example configuration of a processing flow 400 of operations for scheduling for eliminating crossed timeslots may be implemented.

Figure 5:
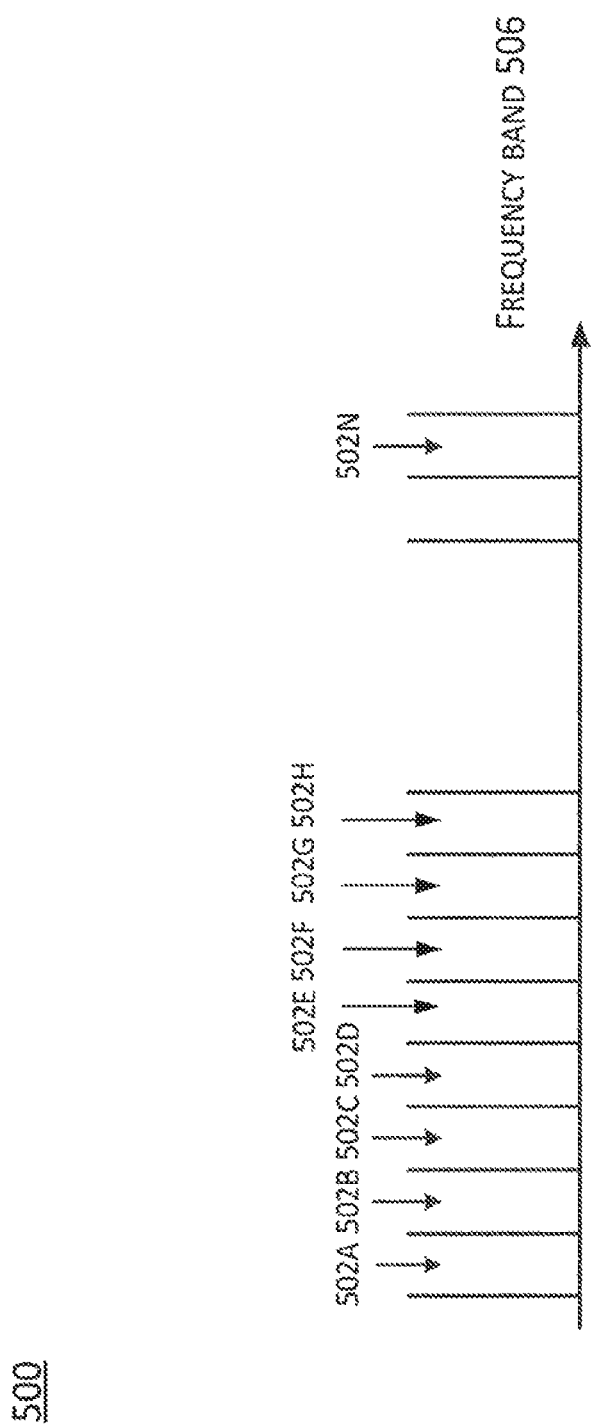
FIG. 5 shows an example frequency band in accordance with one or more embodiments of eliminating crossed timeslots, arranged in accordance with at least some embodiments described herein.

FIG. 5 shows an example frequency band 500 in accordance with one or more embodiments of eliminating crossed timeslots, arranged in accordance with at least some embodiments described herein. As depicted, example frequency band 500 includes a frequency band 506 and resource blocks 502A-502N. Frequency band 506 may be used for wireless communication by cell 114 and cell 116.

Frequency band 506 may represent the total bandwidth that cell 114/116 may use for communication. In one example embodiment, since LTE standard adopts packet switching network based on Orthogonal Frequency-division Multiplexing (OFDM) technology, each wireless communication device uses a section of sub-carrier wave of a frequency band (i.e., a resource block). For example, when base station 102/104 is allocated with 20M bandwidth, which is further divided into one hundred resource blocks, wireless communication devices 106/108 within the working range of the corresponding cell share the 20M bandwidth and each device uses portions of the total bandwidth. As to a specific wireless communication device allocated with 3M bandwidth, it may be allocated with 15 resource blocks.

In at least one example embodiment, in which scheduler 204 may input the identification of cell 114 to a hashing function; the output value (i.e., first starting point on frequency band 506) of the hashing function may be resource block 502A. The scheduler 204 may further schedule a series of resource blocks following 502A including 502B, 502C, and 502D to the one or more wireless communication devices within the working range of cell 114. Similarly, scheduler 204 may input the identification of cell 116 to the hashing function; the output value (i.e., the second starting point on frequency band 506) of the hashing function may be resource block 502E. The resources blocks after 502E including 502F, 502G, and 502H may be allocated to the wireless communication devices within cell 116. The wireless communication devices in working range of two adjacent cells may then be allocated with different sub-carriers of the frequency band and may work on different frequencies. Thus, even when two or more wireless communication devices are working in the same timeslot, the crossed timeslots interference may be avoided.

In another example embodiment, scheduler 204 may input the identification of wireless communication device 106 to a hashing function; the output value may be a specific resource block on the frequency band, for example, 502F. In this example, wireless communication device 106 may then use the frequency defined by resource block 502F for its communication with base station 102. Because of the deterministic feature of hashing function, two different wireless communication devices having different identifiers may always be allocated to different resource blocks (i.e., using different frequency). Thus, wireless communication devices within the working range of a same cell or within the working range of two different cells may avoid interfering with each other.

Thus, FIG. 5 shows an example frequency band 500 of cell 114 and cell 116 in which one or more embodiments of scheduling for eliminating crossed timeslots may be implemented.

Figure 6:
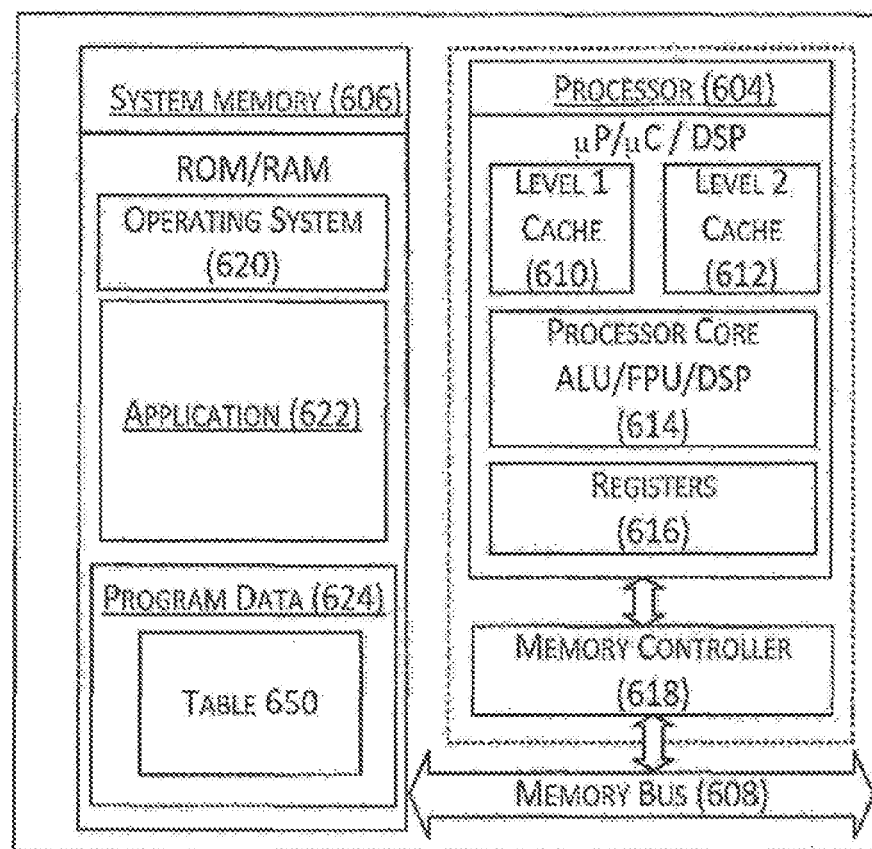
FIG. 6 shows a block diagram illustrating an example computing device by which various example solutions described herein may be implemented, arranged in accordance with at least some embodiments described herein.

FIG. 6 shows a block diagram illustrating an example computing device by which various example solution described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to schedule to eliminate crossed timeslots interference as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
    identifying a first wireless communication device in communication with a first base station of a first cell, wherein the first wireless communication device receives signals from at least a second base station in a second cell;
    selecting, by the first base station, a first starting point that is utilized by the first cell for allocation of resource blocks in the first cell to the first wireless communication device;
    allocating, by the first base station, the resource blocks in the first cell to the first wireless communication device by starting at the first starting point, wherein the allocating the resource blocks in the first cell to the first wireless communication device is performed according to a user-based scheduling algorithm that allocates, based on identifiers of individual wireless communication devices in communication with the first base station, distinct resource blocks in the first cell to each of the individual wireless communication devices;
    selecting, by the second base station, a second starting point for allocation of resource blocks in the second cell to the first wireless communication device, wherein the second starting point is different from the first starting point that is utilized by the first cell; and
    allocating, by the second base station, the resource blocks in the second cell to the first wireless communication device by starting at the second starting point.

2. The method of claim 1, wherein the first starting point is a portion of a radio frequency band.

3. The method of claim 1, wherein the first starting point is a timeslot.

4. The method of claim 1, wherein the first starting point is a portion of a radio frequency band and a timeslot.

5. The method of claim 1, wherein selecting the first starting point comprises selecting the first starting point using a number of resource blocks in the first cell.

6. The method of claim 1, wherein the allocating the resource blocks in the first cell to the first wireless communication device includes allocating the resource blocks in the first cell to the first wireless communication device proportional to traffic needs of the first wireless communication device.

7. The method of claim 1, wherein the allocating the resource blocks includes inputting an identifier of the first wireless communication device to a hashing function, and wherein an output value of the hashing function corresponds to the first starting point.

8. A non-transitory computer-readable medium having stored thereon instructions that, in response to execution by one or more processors, cause the one or more processors to perform or control performance of operations that comprise:
    selecting, for a first base station, a first starting point that is utilized by a first cell for allocation of resource blocks in the first cell to a first wireless communication device, wherein the allocation of the resource blocks in the first cell to the first wireless communication device is performed according to a user-based scheduling algorithm that allocates, based on identifiers of individual wireless communication devices in communication with the first base station, distinct resource blocks in the first cell to each of the individual wireless communication devices; and
    selecting, for a second base station, a second starting point for allocation of resource blocks in a second cell to the first wireless communication device, wherein the second starting point is different from the first starting point that is utilized by the first cell.

9. The non-transitory computer-readable medium of claim 8, wherein the first starting point is a portion of a radio frequency band.

10. The non-transitory computer-readable medium of claim 8, wherein the first starting point is a timeslot.

11. The non-transitory computer-readable medium of claim 8, wherein the first starting point is a portion of a radio frequency band and a timeslot.

12. The non-transitory computer-readable medium of claim 8, wherein selecting the first starting point comprises selecting the first starting point using a number of resource blocks in the first cell.

13. The non-transitory computer-readable medium of claim 8, wherein the first wireless communication device receives signals from at least the second base station in the second cell, and wherein the first wireless communication device communicates in a time division duplex mode.

14. The non-transitory computer-readable medium of claim 8, wherein the operations further comprise:
    allocating the resource blocks in the first cell to the first wireless communication device by starting at the first starting point, wherein allocating the resource blocks in the first cell to the first wireless communication device includes allocating the resource blocks in the first cell to the first wireless communication device proportional to traffic needs of the first wireless communication device.

15. A system, comprising:
    a first base station in a first cell and that includes:
        an antenna operable to communicate with a first wireless communication device; and
        a scheduler operatively coupled to the antenna and operable to identify the first wireless communication device that is in communication with the first base station, and operable to select a first starting point that is utilized by the first cell for allocation of resource blocks in the first cell to the first wireless communication device, wherein the allocation of the resource blocks in the first cell to the first wireless communication device is performed according to a user-based scheduling algorithm that allocates, based on identifiers of individual wireless communication devices in communication with the first base station, distinct resource blocks in the first cell to each of the individual wireless communication devices; and a second base station operable to select a second starting point for allocation of resource blocks in a second cell to the first wireless communication device, wherein the second starting point is different from the first starting point that is utilized by the first cell, and wherein the first wireless communication device receives signals from at least the second base station in the second cell.

16. The system of claim 15, wherein the first starting point is a portion of a radio frequency band.

17. The system of claim 15, wherein the first starting point is a timeslot.

18. The system of claim 15, wherein the first starting point is a portion of a radio frequency band and a timeslot.

19. The system of claim 15, wherein to select the first starting point, the scheduler is operable to select the first starting point using a number of resource blocks in the first cell.

20. The system of claim 15, wherein the scheduler is operable to allocate the resource blocks in the first cell to the first wireless communication device by starting at the first starting point, and wherein the scheduler is operable to allocate the resource blocks in the first cell to the first wireless communication device proportional to traffic needs of the first wireless communication device.

* * * * *